Aug. 4, 1931.   A. F. McNISH   1,816,982
GLASS FURNACE FOREHEARTH
Filed Aug. 9, 1929   2 Sheets-Sheet 1
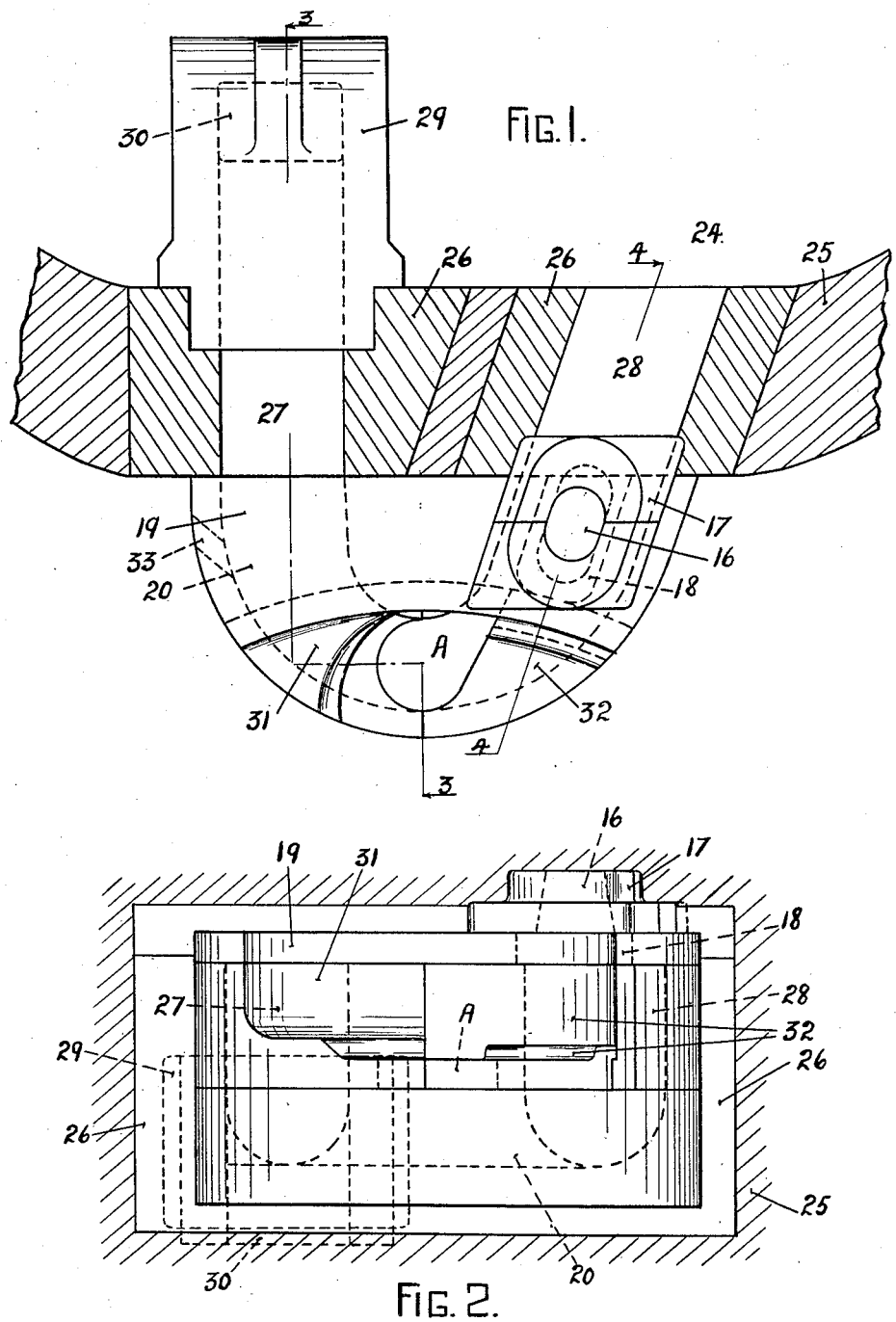

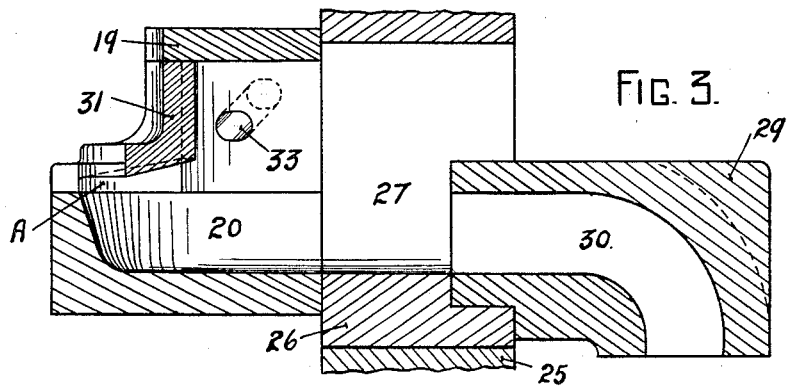
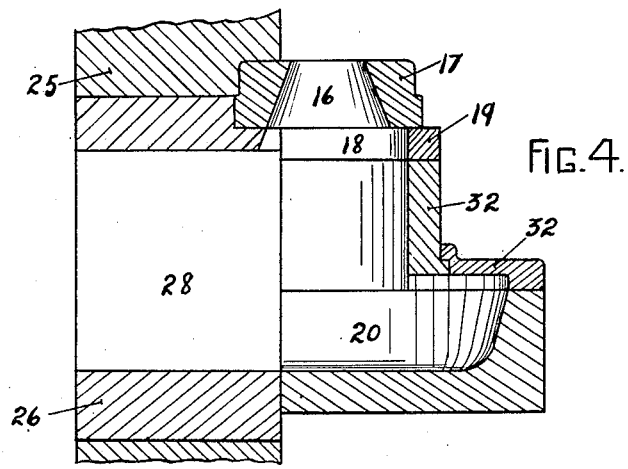
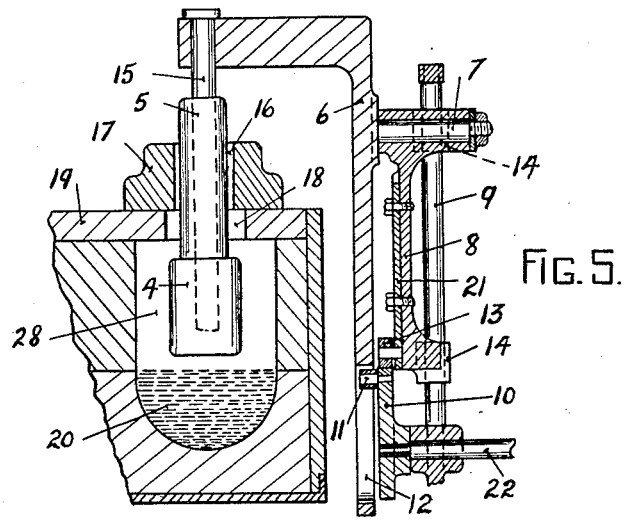

Patented Aug. 4, 1931

1,816,982

UNITED STATES PATENT OFFICE

ALEXANDER FRANCIS McNISH, OF PERTH, SCOTLAND, ASSIGNOR OF ONE-HALF TO JOHN MONCRIEFF LIMITED, OF PERTH, SCOTLAND

GLASS FURNACE FOREHEARTH

Application filed August 9, 1929. Serial No. 384,703.

This invention relates to glass furnaces or like glass melting pots or tanks and more particularly to the forehearth from which the glass is gathered.

The forehearth usually consists of a channel or trough open at both ends to the glass in the furnace or tank and the invention has further reference to the means for circulating the glass through the said channel or trough.

My invention has reference more particularly to furnace forehearths for use in association with gathering devices which gather the glass by suction, and it is one of the objects of my invention to provide a forehearth and glass circulating means which is pre-eminently suited to a suction gathering device which is moved downwards into the gathering position.

The known glass furnace forehearths consist of an open channel or trough, exposing a considerable surface of glass to the chilling action of the atmosphere and rendering the provision of efficient glass circulating means essential to effect the rapid removal of the chilled glass from the gathering position.

The present invention provides a forehearth in which the surface of glass exposed to chilling is reduced to a minimum by covering in the forehearth except at the gathering point, and by the use in association with such a forehearth, of a glass-circulating mechanism which allows of enclosing the glass within the forehearth, so that only the small surface of glass at the gathering point is subject to chilling. The glass at this point is kept warm by the surrounding glass, which is not exposed to any chilling action, and as the glass is less subject to chilling, less trouble is experienced in providing a glass circulating mechanism which will ensure a sufficient rate of flow of glass through the forehearth for bringing a fresh supply of glass to the gathering position and for removing the chilled glass from the gathering position. The invention also enables the glass to be gathered at a quicker rate, that is to say, the speed at which the gathering devices are successively brought into gathering position may be increased by ensuring that the glass is caused to flow through the forehearth at a rate sufficient to bring a fresh supply of glass into the gathering position for each gather.

In order that the features and advantages of the present invention may be more readily understood, reference is hereinafter made to the accompanying drawings which illustrate the preferred construction of my improved forehearth.

Fig. 1 is a cross-section through the front of a glass furnace showing the forehearth in plan. Fig. 2 is a front view of the forehearth.

Figs. 3 and 4 are sectional views on lines 3—3 and 4—4 respectively of Fig. 1.

Fig. 5 is a sectional view on the line 5—5 of Fig. 1 showing the circulating mechanism in position.

The main supply of molten glass is contained in a furnace, tank or like vessel 24 having a front wall 25. Built into the front wall 25 are blocks 26 having apertures 27 and 28 therein which form the inlet and outlet ends of the channel or trough 20 forming the forehearth, the trough 20 being substantially semi-circular or arched in plan. Positioned within the furnace or tank 24 is a skimmer 29 which consists of a hollow block having an L-shaped passage 30 through it, the lower end of the L-shaped passage opening below the surface of the molten glass in the furnace 24 and the other end of the L-shaped passage communicating with the opening 27 in one of the blocks 26. The skimmer 29 serves to prevent the surface glass in the furnace from directly flowing into the channel 20.

The channel 20 is covered with the exception of a small aperture A which is of just sufficient size to admit the insertion of gathering devices such as the vertically movable parison moulds of a glass bottle-making machine. The aperture A is arranged substantially midway of the channel 20 which is covered by the provision over the rear part of the channel of a slab 19, the front edge of which is preferably curved to clear the gathering device, where the latter is of the type rotating in a horizontal plane. The front portion of the channel 20 is covered by shaped blocks 31 and 32 shaped to provide an aperture A between them which is preferably substantially pear-shaped as shown in Fig. 1. The block 31 is cut away around the aperture A to clear the parison mould or gathering device as the latter dips into the gathering position. The block 32 is made in two parts, the lower front part allowing clearance for the shears or knife used to cut off the glass which strings from the gathering device as the latter rises out of the glass.

Through the slab 19 is formed a smaller aperture 18, preferably over that part of the channel 20 in which the glass flows back from the gathering position to the furnace or tank 24 through the opening 28. Through the aperture 18 extends the shank 5 of any suitable glass circulating device, which is preferably of the construction described in my copending patent application Serial No. 354,575, filed 12th April, 1929, and which consists of a clay or other refractory paddle 4 supported on a core rod 15 suspended from the horizontal limb of a paddle holder 6. The opening 18 in the cover slab 19 is closed by a two-part block 17 of clay or other refractory material which has an opening 16 to enclose the shank 5 of the paddle. The opening 16 is in the form of a slightly elongated slot which widens out below in the direction of its major axis, as seen in Figs. 1 and 4, to allow the paddle shank 5 to rock about a horizontal fulcrum and to rise and fall without permitting any appreciable access of air to the channel 20.

As shown on the drawings and as described in my patent application Serial No. 354,575, the fulcrum consists of a pin 7 on the paddle holder 6, the pin 7 being journalled in a slide 8 which is guided vertically and reciprocated by means of a rotating cam 10. The paddle is oscillated about the fulcrum 7 by means of a crank pin 11 which works in a slot 12 in the paddle holder 6.

The cam 10 is shaped to give the desired vertical stroke to the paddle 4 and preferably coacts with a roller 13 adjustably or otherwise mounted on the slide 8 which may be guided by means of fixed vertical guide rods 9 passing through cross heads 14 on the slide 8.

The throw of the crank-pin 11 determines the stroke of the paddle 4 in a horizontal direction and the cam 10 and crank-pin 11 are so situated in relation to one another that the paddle 4 is first dipped into the glass, then rocked in one direction about its fulcrum 7 to move the paddle through the glass in the trough or forehearth, whereupon the paddle 4 is raised out of the glass and finally rocked back again about its fulcrum 7.

The roller 13 may be adjustably mounted on the slide 8 by fitting it on a back plate 21 adjustably bolted to the slide 8.

The cam 10 is mounted on a cam shaft 22 which is rotated by any convenient means and the cam 10 is shaped to give the desired height of stroke and dipping movement.

It will be noted also that the mechanism can be arranged outside the forehearth so that the paddle holder overhangs the outside wall of the forehearth.

When the paddle is not in operation, the glass is at the same level in the furnace 24 and forehearth 20. When the paddle is operated, it forces the glass back into the furnace, causing the glass immediately behind the paddle to be at a slightly lower level, so that the glass flows by gravity from the furnace through the skimmer 29 and channel 20 to the gathering position A and from thence to the paddle. The residuum of cooled glass cut off from the gathering device by the shears or knife falls back into the channel 20 and is carried by the molten glass away from the gathering position and returned by the paddle to the furnace for reheating. The knife or shears is preferably arranged to throw the severed glass towards the paddle and clear of the gathering position.

The paddle preferably returns the glass to the furnace in a direction away from the glass entering the forehearth through the skimmer 29 and for this purpose it has been found in practice that the passage leading back to the furnace from the paddle should preferably be at an angle of about 20° to the direction of the passage leading the glass from the furnace into the channel or forehearth.

An air inlet aperture 33 is preferably formed in the side of the forehearth to direct air in a downward direction on to the surface of glass in the channel 20 for the purpose of slightly cooling the glass on its way to the gathering position and in order to prevent an air-lock. The aperture 33 preferably opens in a direction towards the gathering position so that the entering air does not retard the flow of glass. The aperture 33 may also be used for the purpose of inserting a gas or other burner to reheat the glass after a stoppage.

Claim:

The combination with a glass reservoir, of a horizontally arranged channel open at both ends to said reservoir, said channel being in the form of a return bend having divergent limbs, one limb of which extends out from the wall of the reservoir at right angles thereto, while the other limb returns the glass to the reservoir in a direction away from the glass entering the channel, a gathering portion formed by a substantially semi-circular bend in the channel at the part furthest removed from the reservoir, and a cover over said channel having apertures to receive gathering and circulating devices.

In testimony whereof I have affixed my signature.

ALEXANDER F. McNISH.